(12) United States Patent
Yoo et al.

(10) Patent No.: US 11,960,058 B2
(45) Date of Patent: Apr. 16, 2024

(54) OPTICAL IMAGING SYSTEM

(71) Applicant: SAMSUNG ELECTRO-MECHANICS CO., LTD., Suwon-si (KR)

(72) Inventors: Ho Sik Yoo, Suwon-si (KR); Dong Shin Yang, Suwon-si (KR); Yong Joo Jo, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/299,984

(22) Filed: Apr. 13, 2023

(65) Prior Publication Data

US 2023/0251463 A1    Aug. 10, 2023

Related U.S. Application Data

(63) Continuation of application No. 17/101,187, filed on Nov. 23, 2020, now Pat. No. 11,656,434, which is a
(Continued)

(30) Foreign Application Priority Data

Aug. 21, 2017   (KR) .................. 10-2017-0105365

(51) Int. Cl.
*G02B 9/34*    (2006.01)
*G02B 9/38*    (2006.01)
(Continued)

(52) U.S. Cl.
CPC ............ *G02B 13/004* (2013.01); *G02B 9/38* (2013.01); *G02B 9/50* (2013.01); *G02B 9/56* (2013.01);
(Continued)

(58) Field of Classification Search
CPC .... G02B 13/004; G02B 9/50; G02B 13/0065; G02B 9/56; G02B 13/02; G02B 9/38; G02B 13/18; G02B 5/08
See application file for complete search history.

(56) References Cited

U.S. PATENT DOCUMENTS 8,179,616 B1 *   5/2012   Hsu ..................... G02B 9/34
                                                    359/781
9,869,846 B1    1/2018   Bone et al.
(Continued)

FOREIGN PATENT DOCUMENTS

CN        201319090 Y      9/2009
CN        101776788 A      7/2010
(Continued)

OTHER PUBLICATIONS

Korean Office Action dated Jun. 27, 2018 in counterpart Korean Patent Application No. 10-2017-0105365 (15 pages, in Korean with English translation).
(Continued)

*Primary Examiner* — Joseph P Martinez
(74) *Attorney, Agent, or Firm* — NSIP Law

(57) ABSTRACT

An optical imaging system includes a first lens, a second lens, a third lens, and a fourth lens sequentially disposed from an object side toward an image side on an optical axis, and a reflecting member disposed closer to the object side, as compared to the first lens, and having a reflecting surface configured to change a path of light to be incident to the first to fourth lenses. The first to fourth lenses are disposed to be spaced apart from each other by a preset distance along the optical axis, and 1.3<TTL/BFL<3.5, where TTL is a distance from an object-side surface of the first lens to an
(Continued)

imaging plane of an image sensor, and BFL is a distance from an image-side surface of the fourth lens to the imaging plane of the image sensor.

12 Claims, 6 Drawing Sheets

Related U.S. Application Data continuation of application No. 15/892,758, filed on Feb. 9, 2018, now Pat. No. 10,877,245.

(51) Int. Cl.
    *G02B 9/50*     (2006.01)
    *G02B 9/56*     (2006.01)
    *G02B 13/00*     (2006.01)
    *G02B 13/02*     (2006.01)

(52) U.S. Cl.
    CPC ......... *G02B 13/0065* (2013.01); *G02B 13/02* (2013.01)

(56) References Cited

U.S. PATENT DOCUMENTS

| | | |
|---|---|---|
| 2012/0293875 A1 | 11/2012 | Tsai et al. |
| 2015/0144812 A1 | 5/2015 | Ishikawa et al. |
| 2016/0044250 A1 | 2/2016 | Shabtay et al. |
| 2016/0291295 A1 | 10/2016 | Shabtay et al. |

FOREIGN PATENT DOCUMENTS

| | | |
|---|---|---|
| CN | 201984202 U | 9/2011 |
| CN | 202221491 U | 5/2012 |
| CN | 105425360 A | 3/2016 |
| CN | 106526787 A | 3/2017 |
| CN | 106576138 A | 4/2017 |
| JP | 5022172 B2 | 9/2012 |
| JP | 2015-102623 A | 6/2015 |
| KR | 10-2016-0000759 A | 1/2016 |
| KR | 10-2016-0115956 A | 10/2016 |
| KR | 10-2016-0115961 A | 10/2016 |
| WO | WO 2015/134173 A1 | 9/2015 |
| WO | WO 2015/134174 A1 | 9/2015 |

OTHER PUBLICATIONS

Chinese Office Action dated Sep. 2, 2020, counterpart of Chinese Patent Application No. 201810420170.3 (9 pages in English, 9 pages in Chinese).

Chinese Office Action dated Feb. 19, 2021 issued in the related Chinese Patent Application No. 201810420170.3. (7 pages in English)(6 pages in Chinese).

Chinese Office Action dated Aug. 27, 2021 issued in counterpart Chinese Patent Application No. 201810420170.3 (4 pages in English and 5 pages in Chinese).

* cited by examiner

OPTICAL IMAGING SYSTEM

CROSS-REFERENCE TO RELATED APPLICATIONS

This application is a continuation of U.S. application Ser. No. 17/101,187, filed on Nov. 23, 2020, which is a continuation of U.S. application Ser. No. 15/892,758, filed on Feb. 9, 2018, now U.S. Pat. No. 10,877,245 B2, which claims the benefit under 35 USC 119(a) of Korean Patent Application No. 10-2017-0105365 filed on Aug. 21, 2017, in the Korean Intellectual Property Office, the entire disclosures of which are incorporated herein by reference for all purposes.

BACKGROUND

1. Field

This application relates to an optical imaging system.

2. Description of the Background

Recently, mobile communications terminals have commonly been provided with camera modules, enabling video calling and image capturing. As the utilization of camera modules mounted in mobile communications terminals has increased, camera modules for mobile communications terminals have gradually been required to have higher resolution and higher performance.

However, since there is a trend for mobile communications terminals to gradually be miniaturized and lightened, there appear to be limitations in realizing camera modules having higher resolution and higher performance.

Particularly, a telephoto lens may have a relatively long focal length. In this case, a total track length (TTL) is also increased. Therefore, when a telephoto lens is mounted in a small mobile electronic apparatus, a size (a thickness) of the mobile electronic apparatus is also increased.

The above information disclosed in this Background section is only for enhancement of understanding of the background of the disclosure and therefore it may contain information that does not form any part of the prior art nor what the prior art may suggest to a person of ordinary skill in the art.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, and a fourth lens sequentially disposed from an object side toward an image side on an optical axis, and a reflecting member disposed closer to the object side, as compared to the first lens, and having a reflecting surface configured to change a path of light to be incident to the first to fourth lenses. The first to fourth lenses are disposed to be spaced apart from each other by a preset distance along the optical axis, and $1.3<TTL/BFL<3.5$, where TTL is a distance from an object-side surface of the first lens to an imaging plane of an image sensor, and BFL is a distance from an image-side surface of the fourth lens to the imaging plane of the image sensor.

In the optical imaging system, FOV may be less than or equal to 40°, where FOV is a field of view of an optical system including the first to fourth lenses.

In the optical imaging system, DF/DC may be greater than 0.9 and less than 1.3, where DF is an effective aperture radius of the image-side surface of the fourth lens, and DC is an effective aperture radius of the object-side surface of the first lens.

In the optical imaging system, TTL/f may be greater than 0.8 and less than 1.5, where f is an overall focal length of an optical system including the first to fourth lenses.

In the optical imaging system, f12/f may be greater than 0.75 and less than 1.8, where f12 is a composite focal length of the first lens and the second lens, and f is an overall focal length of an optical system including the first to fourth lenses.

The first lens may have positive refractive power and a convex object-side surface, and the second lens may have a negative refractive power and a concave image-side surface.

The first lens may have positive refractive power, the second lens may have negative refractive power, the third lens may have negative refractive power, and the fourth lens may have positive refractive power.

The first lens may have a convex object-side surface and a convex image-side surface.

The first lens may have a convex object-side surface and a concave image-side surface.

The second lens may have a convex object-side surface and a concave image-side surface.

The third lens may have a convex object-side surface and a convex image-side surface.

The fourth lens may have a convex object-side surface and a concave image-side surface.

The first lens and the fourth lens may include a first plastic material, and the second lens and the third lens may include plastic materials having optical characteristics different from those of the first plastic material.

The plastic material of the second lens may include optical characteristics different from the plastic material of the third lens.

In another general aspect, an optical imaging system includes a reflecting member having a reflecting surface configured to change a path of light, and lenses to which the changed path of light is configured to be incident sequentially disposed from an object side toward an image side on an optical axis. The reflecting member is disposed to the object side of the lenses. TTL/BFL is greater than 1.3 and less than 3.5, where TTL is a distance from an object-side surface of a lens closest to the reflecting member among the lenses, to an imaging plane of an image sensor, and BFL is a distance from an image-side surface of a lens closest to the image sensor among the lenses, to the imaging plane of the image sensor, and $0.9<DF/DC<1.3$, where DF is an effective aperture radius of the image-side surface of the lens closest to the image sensor, and DC is an effective aperture radius of the object-side surface of the lens closest to the reflecting member.

The lenses may include a first lens having positive refractive power and a convex object-side surface, a second lens having negative refractive power and a concave image-side surface, a third lens having refractive power, and a fourth lens having refractive power. The first to fourth lenses may be sequentially disposed from the object side toward the image side.

The first lens may be the lens closest to the reflecting member, and the fourth lens may be the lens closest to the image sensor.

In another general aspect, an optical imaging system includes a reflecting member configured to change a path of light to be incident to an object side of lenses, and an image sensor configured to receive light from an image side of the lenses. The lenses include a first lens, a second lens, a third lens, and a fourth lens sequentially disposed from the object side toward the image side on an optical axis. Any one or any combination of any two or more of the following expressions are satisfied: FOV 40°, 0.9<DF/DC<1.3, 1.3<TTL/BFL<3.5, 0.8<TTL/f<1.5, 0.75<f12/f<1.8, and CRA_max<25°, where FOV is a field of view of the optical imaging system, DF is an effective aperture radius of an image-side surface of the fourth lens, DC is an effective aperture radius of an object-side surface of the first lens, TTL is a distance from an object-side surface of the first lens to an imaging plane of the image sensor, BFL is a distance from the image-side surface of the fourth lens to the imaging plane of the image sensor, f is an overall focal length of the optical imaging system, f12 is a composite focal length of the first lens and the second lens, and CRA_max is a maximum value of an incident angle of a principal ray incident on the imaging plane.

The first lens may include positive refractive power, the second lens may include negative refractive power, the third lens may include negative refractive power, and the fourth lens may include positive refractive power.

The first lens may include a convex object-side surface and a convex or concave image-side surface, the second lens may include a convex object-side surface and a concave image-side surface, the third lens may include a convex object-side surface and a convex image-side surface, and/or the fourth lens may include a convex object-side surface and a concave image-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
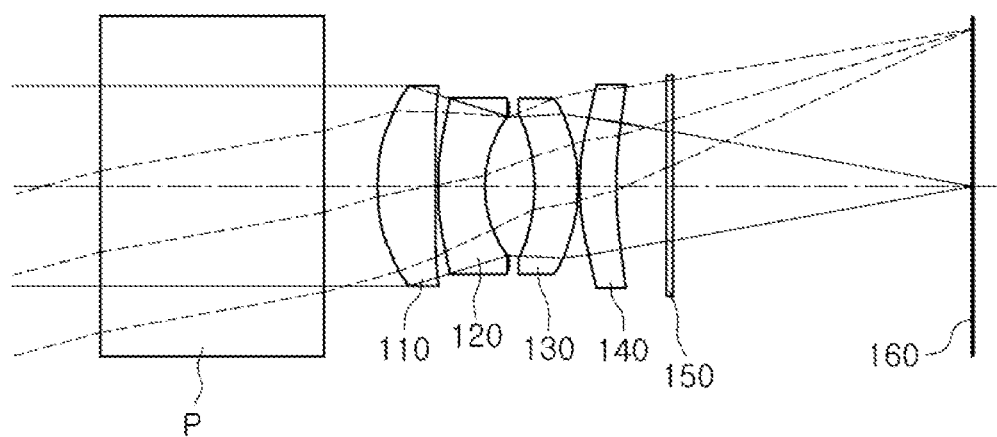
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

An aspect of the present disclosure provides an optical imaging system capable of preventing an increase in a size, for example, a thickness, of a mobile electronic apparatus while having a relatively narrow field of view and a relatively large total track length (TTL).

An optical imaging system according to examples in this application include lenses disposed on an optical axis. The lenses are disposed to be spaced apart from each other by preset distances on the optical axis.

As an example, the optical imaging system includes four lenses.

In the example in which the optical imaging system includes the four lenses, a first lens refers to a lens closest to an object side, while a fourth lens refers to a lens closest to an image sensor.

A first surface of each lens refers to a surface thereof closest to an object side (also referred to as an object-side surface) and a second surface of each lens refers to a surface thereof closest to an image side (also referred to as an image-side surface). Further, in the present specification, all numerical values of radii of curvature, thicknesses, distances, and the like, of lenses are indicated in millimeters (mm), while angles are indicated in degrees.

Further, in a description of a shape of each of the lenses, the meaning that one surface of a lens is convex is that a paraxial region portion of a corresponding surface is convex, and the meaning that one surface of a lens is concave is that a paraxial region portion of a corresponding surface is concave. Therefore, even in the case that it is described that one surface of a lens is convex, an edge portion of the surface may be concave. Likewise, even in the case that it is described that one surface of a lens is concave, an edge portion of the surface may be convex.

A paraxial region refers to a narrow region in the vicinity of an optical axis.

In a state in which the optical imaging system is mounted in a mobile electronic apparatus, optical axes of the lenses of the optical imaging system are formed in a direction perpendicular to a thickness direction (a direction from a front surface of the mobile electronic apparatus toward a rear surface thereof or a direction opposite thereto) of the mobile electronic apparatus.

As an example, the optical axes of the lenses constituting the optical imaging system are formed in a width direction or in a length direction of the mobile electronic apparatus.

Therefore, a total track length (TTL) (for example, a distance from an object-side surface of the first lens to an imaging plane of the image sensor) of the optical imaging system may not have an influence on a thickness of the mobile electronic apparatus. Therefore, even in the case that the TTL of the optical imaging system is relatively great, the TTL does not have an influence on the thickness of the mobile electronic apparatus, and the mobile electronic apparatus may thus be miniaturized.

External light is incident to the mobile electronic apparatus in approximately the thickness direction of the mobile electronic apparatus, and the optical axes of the lenses are formed in the direction perpendicular to the thickness direction of the mobile electronic apparatus. Therefore, the optical imaging system is configured to change a path of the light.

As an example, the optical imaging system includes a reflecting member having a reflecting surface to change the path of light. The reflecting member may be a mirror or a prism changing the path of light.

The examples of the optical imaging system have been described as including four lenses.

For example, the optical imaging system includes a first lens, a second lens, a third lens, and a fourth lens sequentially disposed from the object side.

However, the optical imaging system is not limited to only including four lenses, but may further include other components.

For example, the optical imaging system further includes a reflecting member having a reflecting surface changing a path of light. The reflecting member changes the path of light by 90°. As an example, the reflecting member may be a mirror or a prism.

The reflecting member is closer to the object side as compared to lenses. As an example, among the reflecting member and the lenses, the reflecting member is closest to the object side.

Among the lenses, a lens (for example, the first lens) closest to the object side is closest to the reflecting member.

Further, the optical imaging system further includes an image sensor configured to convert an image of a subject incident on the image sensor into an electrical signal.

The optical imaging system further includes an infrared cut-off filter configured to filter infrared light. The infrared cut-off filter is disposed between a lens (as an example, the fourth lens) closest to the image sensor and the image sensor.

In the optical imaging system of the examples, all of the lenses are formed of plastic materials.

A lens closest to the reflecting member and a lens closest to the image sensor among the lenses constituting the optical imaging system are formed of a first plastic material, the other lenses are formed of plastic materials having optical characteristics different from those of the first plastic material, and the other lenses are formed of plastic materials having optical characteristics different from one another.

As an example, in the optical imaging system including the four lenses, the first lens and the fourth lens are formed of the first plastic material, the second lens and the third lens are formed of plastic materials having optical characteristics different from those of the first plastic material, and the second lens and the third lens are formed of plastic materials having optical characteristics different from each other.

The lenses have at least one aspherical surface.

That is, at least one of first and second surfaces of all of the first to fourth lenses are aspherical. Here, any of the aspherical surfaces of the first to fourth lenses are represented by the following Equation 1:

$$Z = cr^2 / 1 + \sqrt{1-(1+k)c^2r^2} + Ar^4 + Br^6 + Cr^8 + Dr^{10} + Er^{12} + Fr^{14} + Gr^{16} + Hr^{18} + Jr^{20}.$$

Here, c is a curvature (an inverse of a radius of curvature) of a lens, K is a conic constant, and Y is a distance from a certain point on an aspherical surface of the lens to an optical axis in a direction perpendicular to the optical axis. Constants A to F are aspherical coefficients. Z is a distance between the certain point on the aspherical surface of the lens at the distance Y and a tangential plane meeting the apex of the aspherical surface of the lens.

The optical imaging system including the first to fourth lenses have positive refractive power/negative refractive power/negative refractive power/positive refractive power sequentially from the object side.

The optical imaging system according to the examples satisfy the following Conditional Expressions:

$FOV \leq 40°$ $0.9 < DF/DC < 1.3$ $1.3 < TTL/BFL < 3.5$ $0.8 < TTL/f < 1.5$ $0.75 < f12/f < 1.8$ $CRA\_max < 25°.$ In Equation 1, FOV is a field of view of the optical imaging system, DF is an effective aperture radius of an image-side surface of a lens closest to the image sensor, DC is an effective aperture radius of an object-side surface of a lens closest to the object side (or the reflecting member), TTL is a distance from an object-side surface of the first lens to an imaging plane of the image sensor, BFL is a distance from the image-side surface of the lens closest to the image sensor to the imaging plane of the image sensor, f is an overall focal length of the optical imaging system, f12 is a composite focal length of the first lens and the second lens, and CRA_max is a maximum value of an incident angle of a principal ray incident on the imaging plane.

The effective aperture radius refers to a radius of one surface (an object-side surface and an image-side surface) of each lens through which light actually passes.

Next, the first to fourth lenses constituting the optical imaging system according to the examples will be described.

The first lens has positive refractive power.

Both surfaces of the first lens are convex. For example, first and second surfaces of the first lens are convex. Alternatively, the first lens has a meniscus shape of which an object-side surface is convex. For example, the first surface of the first lens is convex, and the second surface thereof is concave.

At least one of the first and second surfaces of the first lens is aspherical. For example, both surfaces of the first lens are aspherical.

The second lens has negative refractive power. The second lens has a meniscus shape of which an object-side surface is convex. For example, a first surface of the second lens is convex, and a second surface thereof is concave.

At least one of the first and second surfaces of the second lens is aspherical. For example, both surfaces of the second lens are aspherical.

The third lens has negative refractive power. The third lens has a meniscus shape of which an image-side surface is convex. For example, a first surface of the third lens is concave, and a second surface thereof is convex.

At least one of the first and second surfaces of the third lens is aspherical. For example, both surfaces of the third lens are aspherical.

The fourth lens has positive refractive power. The fourth lens has a meniscus shape of which an object-side surface is convex. For example, a first surface of the fourth lens is convex, and a second surface thereof is concave.

At least one of the first and second surfaces of the fourth lens is aspherical. For example, both surfaces of the fourth lens are aspherical.

The first to fourth lenses are lenses on which inflection points are not formed.

In the optical imaging system configured as described above, the lenses perform an aberration correction function to thus increase aberration improvement performance.

The optical imaging system has a feature of a telephoto lens having a field of view of 40° or less. The optical imaging system has a relatively narrow field of view and a relatively long overall focal length.

A first example of an optical imaging system will be described with reference to FIGS. 1 through 3.

The optical imaging system according to the first example includes an optical system including a first lens 110, a second lens 120, a third lens 130, and a fourth lens 140, and further includes an infrared cut-off filter 150 and an image sensor 160.

The optical imaging system further includes a reflecting member P closer to an object side as compared to the first lens 110 and having a reflecting surface changing a path of light.

Here, lens characteristics (radii of curvature, thicknesses of lenses or distances between the lenses, refractive indices, Abbe numbers, and effective aperture radii) of each lens are represented in Table 1.

TABLE 1

| Surface No. | Radius of Curvature | Thickness or Distance | Refractive Index | Abbe Number | Effective Aperture Radius |
|---|---|---|---|---|---|
| Prism | infinity | 4.300 | 1.5167 | 64.17 | |
| Prism | infinity | 1.000 | | | |
| 1 | 3.254501135 | 1.134841384 | 1.5441 | 56.11 | 1.862 |
| 2 | −152.590894 | 0.030001661 | | | 1.722 |
| 3 | 4.820975086 | 0.900080445 | 1.6349 | 23.97 | 1.632 |
| 4 | 2.048937542 | 0.960625226 | | | 1.312 |
| 5 | −2.46741293 | 0.817889534 | 1.6144 | 25.95 | 1.366 |
| 6 | −3.11220229 | 0.030892447 | | | 1.634 |
| 7 | 3.323254281 | 0.700000126 | 1.5441 | 56.11 | 1.845 |
| 8 | 5.614984106 | 0.967508944 | | | 1.887 |
| 9 | infinity | 0.11 | 1.5167 | 64.17 | |
| 10 | infinity | 5.72105725 | | | |
| 11 | infinity | | | | |

In the first example, an overall focal length f of the optical imaging system is 10.6893 mm, a focal length f1 of the first lens 110 is 5.871596 mm, a focal length f2 of the second lens 120 is −6.421992 mm, a focal length f3 of the third lens 130 is −37.4734 mm, and a focal length f4 of the fourth lens 140 is 13.510605 mm.

A field of view (FOV) of the optical imaging system is 30.24°, an effective aperture radius (DC) of an object-side surface of the first lens 110 is 1.862 mm, an effective aperture radius (DF) of an image-side surface of the fourth lens 140 is 1.887 mm, a distance (TTL) from the object-side surface of the first lens 110 to an imaging plane of the image sensor 160 is 11.373 mm, a distance (BFL) from the image-side surface of the fourth lens 140 to the imaging plane of the image sensor 160 is 6.799 mm, a composite focal length (f12) of the first lens 110 and the second lens 120 is 15.7264 mm, and a maximum value (CRA_max) of an incident angle of a principal ray incident on the imaging plane is 16.63°.

In the first example, the first lens 110 has positive refractive power, and a first surface and a second surface thereof are convex in a paraxial region.

The second lens 120 has negative refractive power, and a first surface thereof is convex in a paraxial region and a second surface thereof is concave in the paraxial region.

The third lens 130 has negative refractive power, and a first surface thereof is concave in a paraxial region and a second surface thereof is convex in the paraxial region.

The fourth lens 140 has positive refractive power, and a first surface thereof is convex in a paraxial region and a second surface thereof is concave in the paraxial region.

The first lens 110 and the fourth lens 140 are formed of a first plastic material, the second lens 120 and the third lens 130 are formed of plastic materials having optical characteristics different from those of the first plastic material, and the second lens 120 and the third lens 130 are formed of plastic materials having optical characteristics different from each other.

All of the first to fourth lenses 110 to 140 are lenses on which inflection points are not formed.

Respective surfaces of the first to fourth lenses 110 to 140 have aspherical coefficients as illustrated in Table. 2. For example, all of object-side surfaces and image-side surfaces of the first to fourth lenses 110 to 140 are aspherical.

TABLE 2

| Surface | S1 | S2 | S3 | S4 |
|---|---|---|---|---|
| R | 3.25450114E+00 | −1.52590894E+02 | 4.82097509E+00 | 2.04893754E+00 |
| K | 1.12247811E+00 | 0.00000000E+00 | 0.00000000E+00 | 0.00000000E+00 |
| A | −2.93087621E−03 | 3.08885231E−03 | −9.71881812E−03 | −1.67492903E−02 |
| B | −6.03090776E−04 | −1.55177834E−03 | −7.75346961E−04 | 1.12149397E−03 |
| C | −9.43451358E−05 | 1.35090893E−03 | 1.46983797E−03 | −2.38906969E−04 |
| D | 1.54995264E−05 | −4.95921618E−04 | −5.84288723E−04 | 7.49703655E−04 |
| E | −8.14345763E−06 | 6.88446582E−05 | 7.69230485E−05 | −2.01012950E−04 |

| Surface | S5 | S6 | S7 | S8 |
|---|---|---|---|---|
| R | −2.46741293E+00 | −3.11220229E+00 | 3.32325428E+00 | 5.61498411E+00 |
| K | 0.00000000E+00 | 0.00000000E+00 | 0.00000000E+00 | 0.00000000E+00 |
| A | 4.27481176E−02 | 4.14217107E−03 | −3.44593845E−02 | −1.23689361E−02 |
| B | −1.87912212E−02 | −2.67943122E−03 | 6.49482597E−03 | −6.92154503E−04 |

TABLE 2-continued

| | | | | |
|---|---|---|---|---|
| C | 9.02786550E−03 | 2.38752870E−03 | −5.91158915E−04 | 7.76013714E−04 |
| D | −1.54167364E−03 | −5.79265734E−04 | 2.84559575E−05 | −5.04688822E−05 |
| E | 7.24405414E−07 | 2.64231849E−06 | −5.93158735E−05 | −5.27842068E−05 |
| F | | | 1.22461623E−05 | 9.64415333E−06 |

Figure 2:
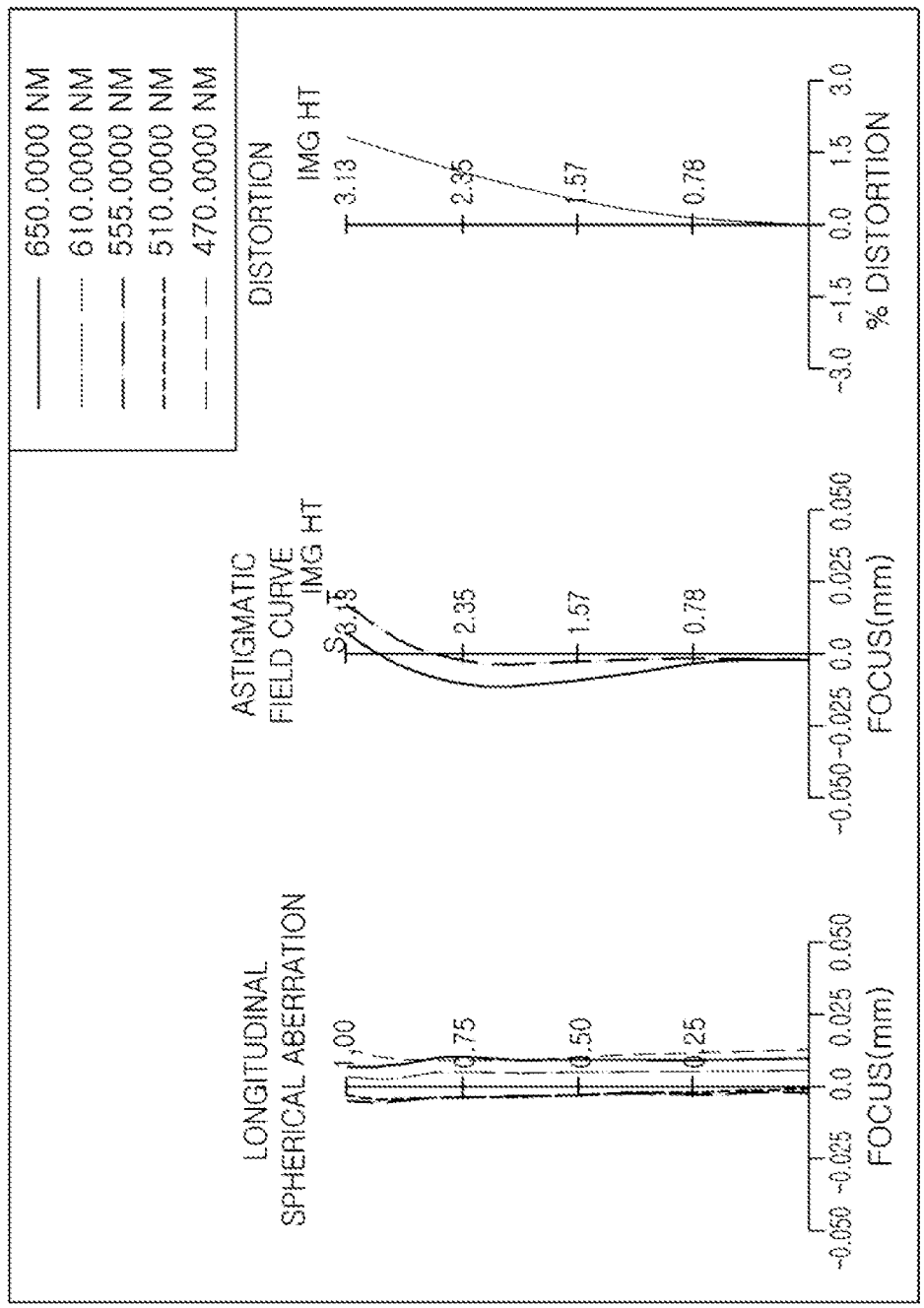
FIGS. 2 and 3 illustrate example graphs having curves representing aberration characteristics of the optical imaging system illustrated in FIG. 1.
Figure 3:
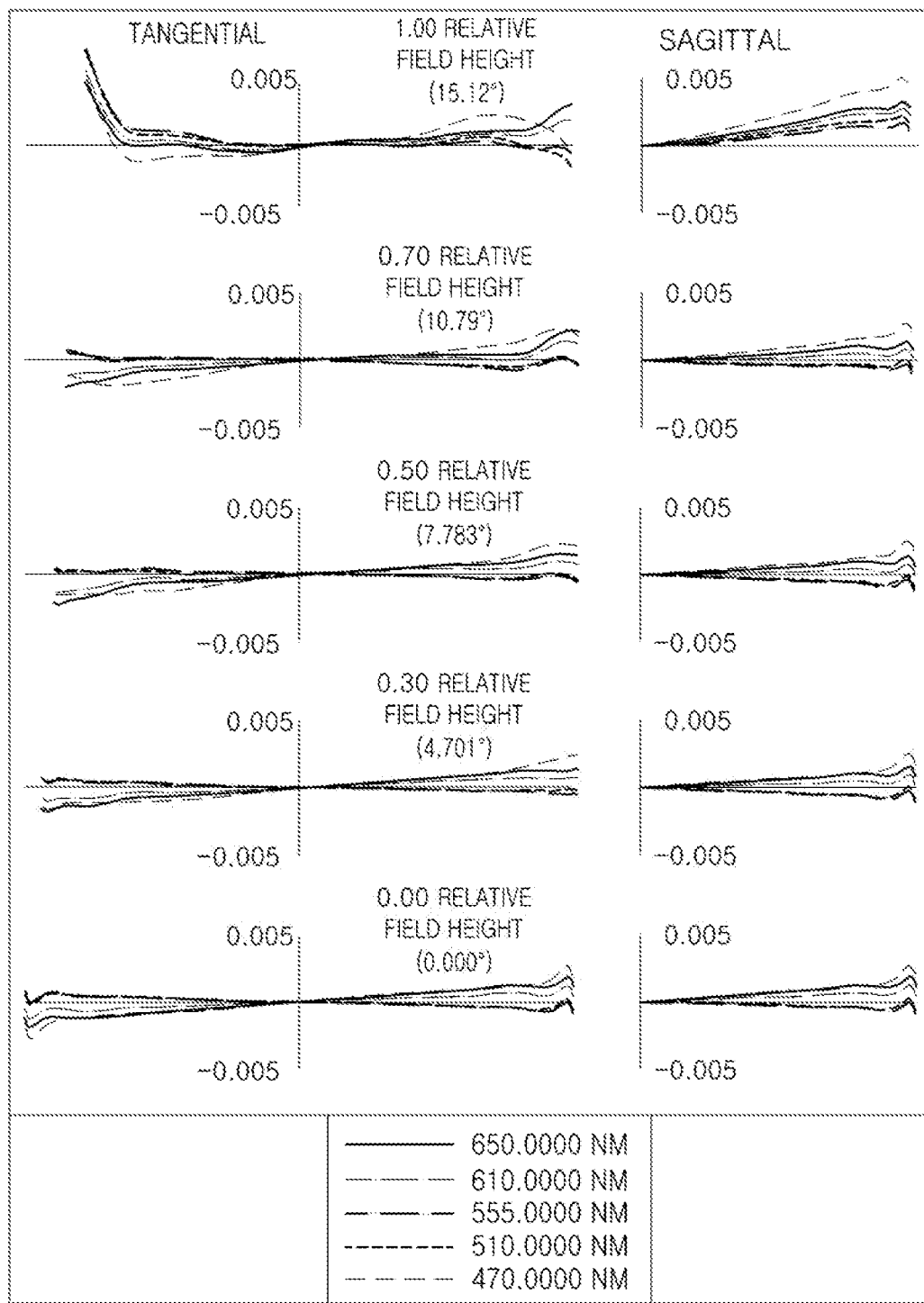

The optical imaging system configured as described above has aberration characteristics illustrated in FIGS. 2 and 3.

Figure 4:
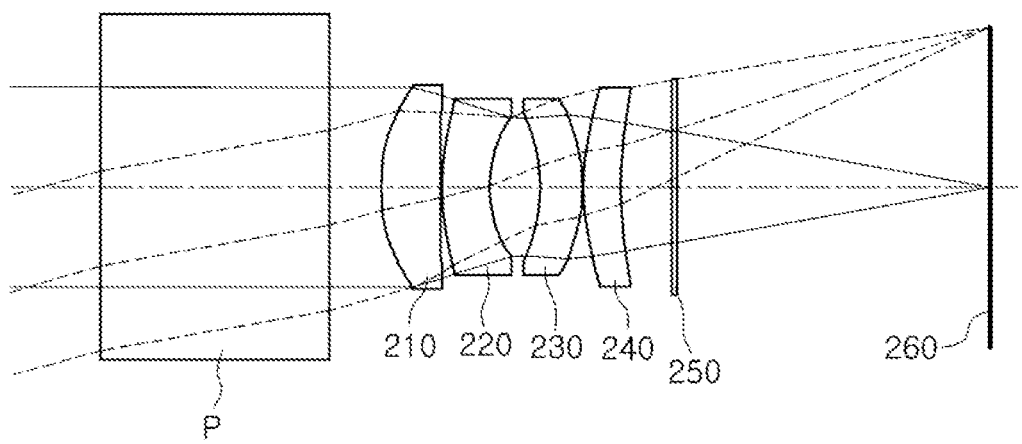
FIG. 4 is a view illustrating a second example of an optical imaging system.

A second example of an optical imaging system will be described with reference to FIGS. 4 through 6.

The optical imaging system according to the second example includes an optical system including a first lens 210, a second lens 220, a third lens 230, and a fourth lens 240, and further includes an infrared cut-off filter 250 and an image sensor 260.

The optical imaging system further includes a reflecting member P closer to an object side as compared to the first lens 210 and having a reflecting surface changing a path of light.

Here, lens characteristics (radii of curvature, thicknesses of lenses or distances between the lenses, refractive indices, Abbe numbers, and effective aperture radii) of each lens are represented in Table 3.

TABLE 3

| Surface No. | Radius of Curvature | Thickness or Distance | Refractive Index | Abbe Number | Effective Aperture Radius |
|---|---|---|---|---|---|
| Prism | infinity | 4.300 | 1.5167 | 64.17 | |
| Prism | infinity | 1.000 | | | |
| 1 | 3.229258844 | 1.122792676 | 1.5441 | 56.11 | 1.850 |
| 2 | 3091.218237 | 0.03 | | | 1.705 |
| 3 | 4.748586431 | 0.886922529 | 1.6349 | 23.97 | 1.620 |
| 4 | 2.024253753 | 0.9614216 | | | 1.257 |
| 5 | −2.46875098 | 0.788079933 | 1.6144 | 25.95 | 1.359 |
| 6 | −3.07358344 | 0.03 | | | 1.617 |
| 7 | 3.367820575 | 0.700602456 | 1.5441 | 56.11 | 1.822 |
| 8 | 5.775095248 | 0.95657511 | | | 1.867 |
| 9 | infinity | 0.11 | 1.5167 | 64.17 | |
| 10 | infinity | 5.856604534 | | | |
| 11 | infinity | | | | |

In the second example, an overall focal length f of the optical imaging system is 10.7822 mm, a focal length f1 of the first lens 210 is 5.940492 mm, a focal length f2 of the second lens 220 is −6.401719 mm, a focal length f3 of the third lens 230 is −40.50323 mm, and a focal length f4 of the fourth lens 240 is 13.468033 mm.

A field of view (FOV) of the optical imaging system is 30.04°, an effective aperture radius (DC) of an object-side surface of the first lens 210 is 1.85 mm, an effective aperture radius (DF) of an image-side surface of the fourth lens 240 is 1.867 mm, a distance (TTL) from the object-side surface of the first lens 210 to an imaging plane of the image sensor 260 is 11.443 mm, a distance (BFL) from the image-side surface of the fourth lens 240 to the imaging plane of the image sensor 260 is 6.923 mm, a composite focal length (f12) of the first lens 210 and the second lens 220 is 16.4729 mm, and a maximum value (CRA_max) of an incident angle of a principal ray incident on the imaging plane is 16.568°.

In the second example, the first lens 210 has positive refractive power, and a first surface thereof is convex in a paraxial region and a second surface thereof is concave in the paraxial region.

The second lens 220 has negative refractive power, and a first surface thereof is convex in a paraxial region and a second surface thereof is concave in the paraxial region.

The third lens 230 has negative refractive power, and a first surface thereof is concave in a paraxial region and a second surface thereof is convex in the paraxial region.

The fourth lens 240 has positive refractive power, and a first surface thereof is convex in a paraxial region and a second surface thereof is concave in the paraxial region.

The first lens 210 and the fourth lens 240 are formed of a first plastic material, the second lens 220 and the third lens 230 are formed of plastic materials having optical characteristics different from those of the first plastic material, and the second lens 220 and the third lens 230 are formed of plastic materials having optical characteristics different from each other.

All of the first to fourth lenses 210 to 240 are lenses on which inflection points are not formed.

Respective surfaces of the first to fourth lenses 210 to 240 have aspherical coefficients as illustrated in Table. 4. For example, all of object-side surfaces and image-side surfaces of the first to fourth lenses 210 to 240 are aspherical.

TABLE 4

| Surface | S1 | S2 | S3 | S4 |
|---|---|---|---|---|
| R | 3.22925884E+00 | 3.09121824E+03 | 4.71858643E+00 | 2.02425375E+00 |
| K | 1.12733268E+00 | 0.00000000E+00 | 0.00000000E+00 | 0.00000000E+00 |
| A | −2.91252696E−03 | 3.18876500E−03 | −1.01279285E−02 | −1.77062176E−02 |
| B | −7.25411438E−04 | −1.65034789E−03 | −4.73706916E−04 | 2.29233274E−03 |
| C | −3.49226702E−05 | 1.49024285E−03 | 1.34520649E−03 | −1.45352361E−03 |
| D | −2.092399959E−06 | −5.70716275E−04 | −5.77192419E−04 | 1.45712465E−03 |
| E | −6.95453838E−06 | 8.20730484E−05 | 7.98045969E−05 | −3.45733760E−04 |

| Surface | S5 | S6 | S7 | S8 |
|---|---|---|---|---|
| R | −2.46875098E+00 | −3.07358344E+00 | 3.36782058E+00 | 5.77509525E+00 |
| K | 0.00000000E+00 | 0.00000000E+00 | 0.00000000E+00 | 0.00000000E+00 |
| A | 4.28687352E−02 | 4.305664437E−03 | −3.50692924E−02 | −1.27288018E−02 |
| B | −1.85205970E−02 | −3.07696460E−03 | 5.97266181E−03 | −1.13580054E−03 |
| C | 8.30407571E−03 | 2.61783612E−03 | 6.34612226E−05 | 1.13730181E−03 |
| D | −8.88551012E−04 | −5.64448011E−04 | −2.35317915E−04 | −1.83415130E−04 |

TABLE 4-continued

| | | | |
|---|---|---|---|
| E | −1.60139148E−04 | −2.09965100E−05 | −1.40750387E−05 | −2.86613583E−05 |
| F | | | 9.70247802E−06 | 8.01109643E−06 |

Figure 5:
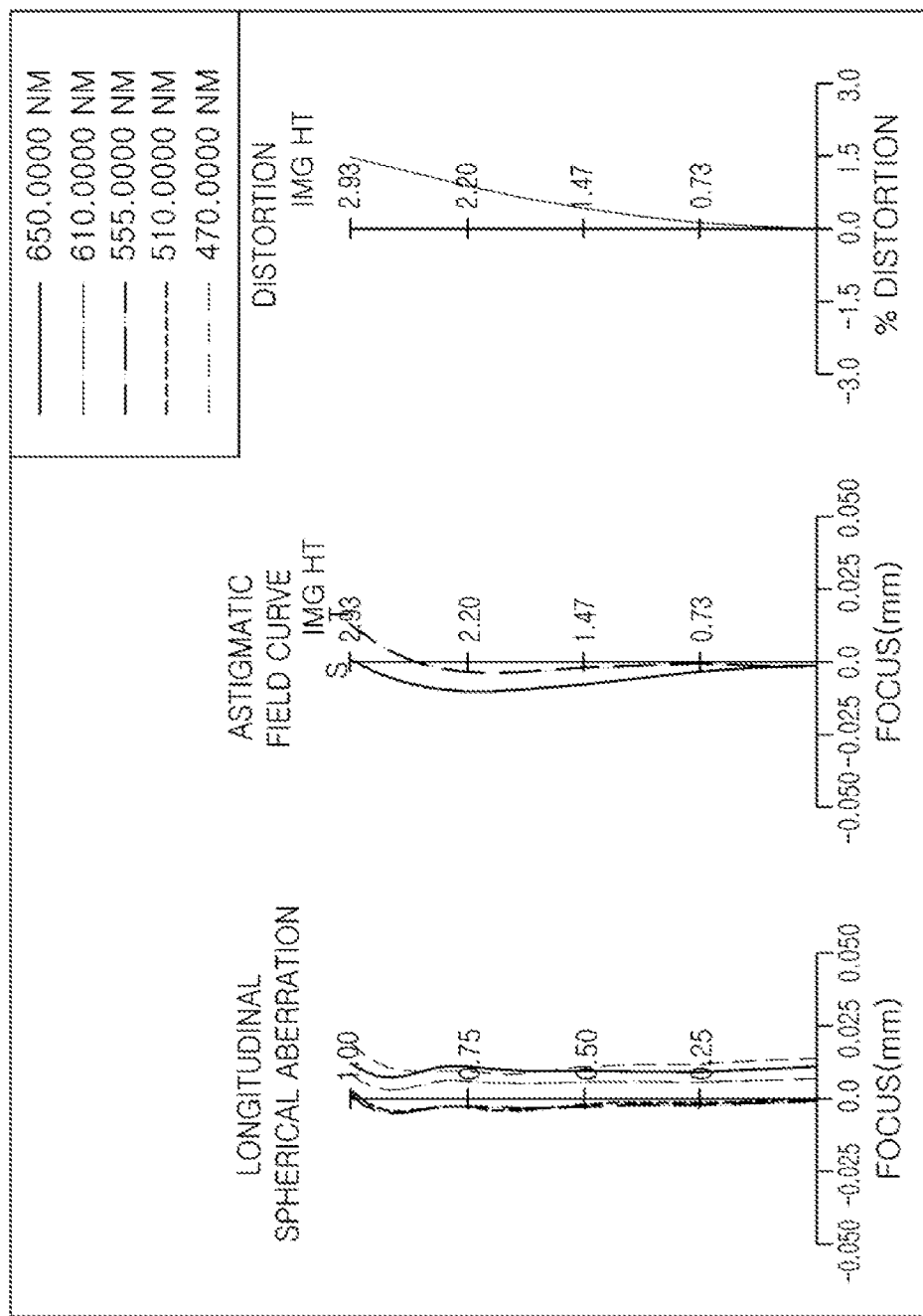
FIGS. 5 and 6 illustrate example graphs having curves representing aberration characteristics of the optical imaging system illustrated in FIG. 4.
Figure 6:
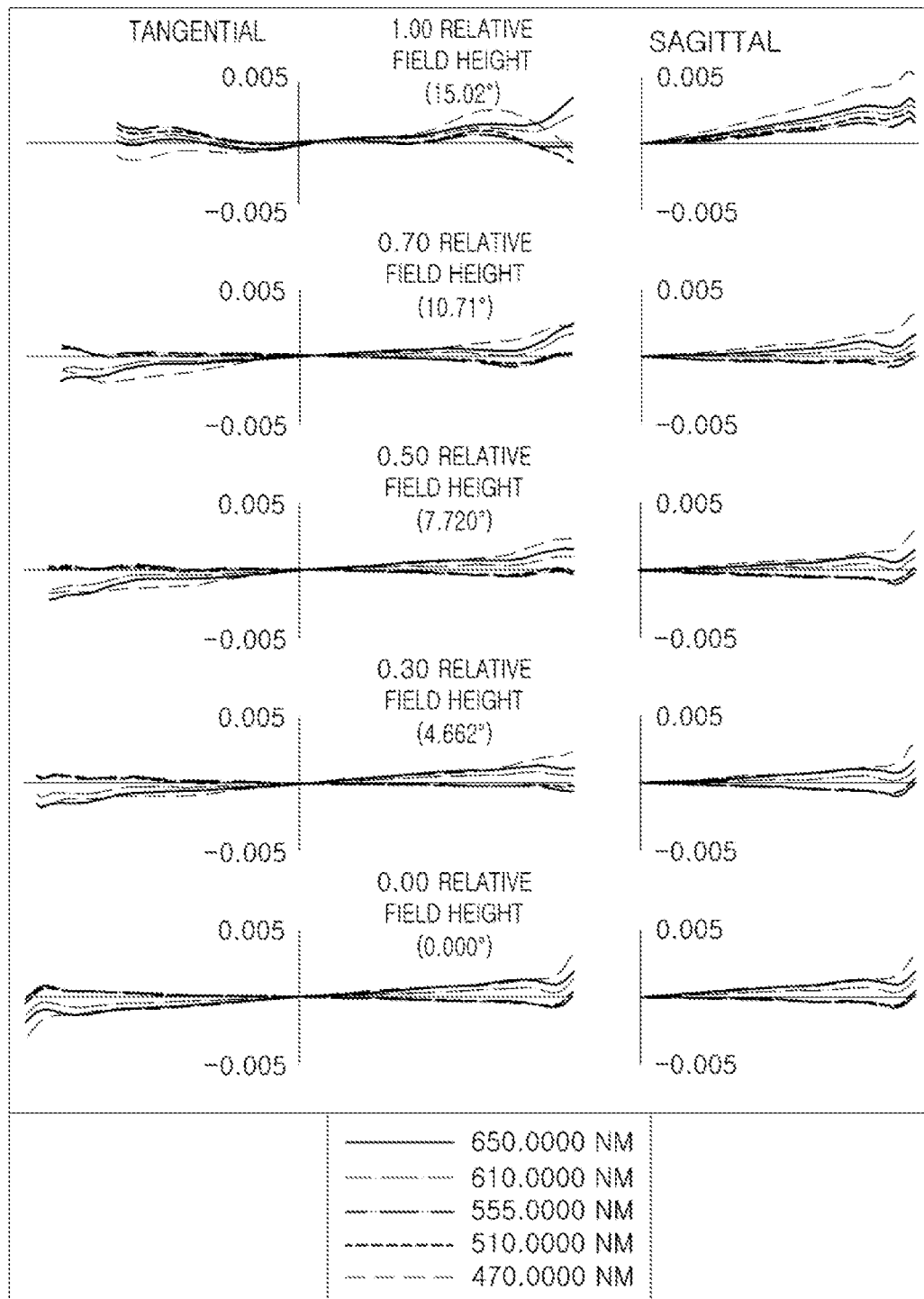

The optical imaging system configured as described above has aberration characteristics illustrated in FIGS. 5 and 6.

As set forth above, the optical imaging system according to the examples in this application may prevent an increase in a size (or a thickness) of a mobile electronic apparatus while having a relatively narrow field of view and a relatively large total track length (TTL).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having positive refractive power and a convex object-side surface;
   a second lens having negative refractive power, a convex object-side surface and a concave image-side surface;
   a third lens having refractive power;
   a fourth lens having positive refractive power, and
   wherein the first to fourth lenses are sequentially disposed from an object side toward an image side on an optical axis,
   wherein the optical imaging system has a total of four lenses,
   wherein 1.3<TTL/BFL<3.5 is satisfied, where TTL is a distance from the object-side surface of the first lens to an imaging plane, and BFL is a distance from an image-side surface of the fourth lens to the imaging plane, and
   wherein FOV≤40° is satisfied, where FOV is a field of view of the optical imaging system.

2. The optical imaging system of claim 1, wherein 0.8<TTL/f<1.5 is satisfied, where f is an overall focal length of an optical imaging system.

3. The optical imaging system of claim 1, wherein the first lens has a convex image-side surface.

4. The optical imaging system of claim 1, wherein the third lens has a convex image-side surface.

5. The optical imaging system of claim 1, wherein the fourth lens has a convex object-side surface.

6. The optical imaging system of claim 5, wherein the fourth lens has a concave image-side surface.

7. The optical imaging system of claim 1, wherein the first to fourth lenses are disposed to be spaced apart from each other by a preset distance along the optical axis.

8. The optical imaging system of claim 1, wherein the first to fourth lenses are formed of plastic materials.

9. The optical imaging system of claim 8, wherein the first lens comprises a first plastic material, and
   the second lens and the third lens comprise plastic materials comprising optical characteristics different from those of the first plastic material.

10. The optical imaging system of claim 9, wherein the plastic material of the second lens comprises optical characteristics different from the plastic material of the third lens.

11. The optical imaging system of claim 1, further comprising a reflecting member disposed closer to the object side, as compared to the first lens, and having a reflecting surface configured to change a path of light to be incident to the first to fourth lenses.

12. The optical imaging system of claim 1, wherein 0.9<DF/DC<1.3 is satisfied, where DF is an effective aperture radius of an image-side surface of the fourth lens, and DC is an effective aperture radius of the object-side surface of the first lens.

* * * * *